United States Patent [19] [11] 3,972,555
Tryon [45] Aug. 3, 1976

[54] TONG TYPE RECOVERY TOOL
[75] Inventor: Paul V. Tryon, Kailua, Hawaii
[73] Assignee: The United States of America as represented by the Secretary of the Navy, Washington, D.C.
[22] Filed: Jan. 2, 1976
[21] Appl. No.: 646,227

[52] U.S. Cl. .............................. 294/106; 24/233; 24/254; 294/66 R; 294/110 R
[51] Int. Cl.² ........................ B63C 7/20; B66C 1/42
[58] Field of Search ............ 294/66 R, 86 R, 86.27, 294/86.29, 83 R, 83 A, 99 R, 100, 106, 110 R, 115, 118; 24/233, 234, 254; 114/50, 51

[56] References Cited
UNITED STATES PATENTS

| | | | |
|---|---|---|---|
| 1,568,808 | 1/1926 | Davison et al. | 294/86.27 |
| 3,367,299 | 2/1968 | Sayre | 114/51 |
| 3,713,414 | 1/1973 | Wischhoefer et al. | 114/50 |
| 3,853,082 | 12/1974 | Rosenberg et al. | 294/83 R X |
| 3,873,145 | 3/1975 | Adkins et al. | 294/66 R |

Primary Examiner—Johnny D. Cherry
Attorney, Agent, or Firm—Richard S. Sciascia; Ervin F. Johnston; Thomas Glenn Keough

[57] ABSTRACT

A recovery tool is designed to be actuated by the manipulator of an undersea vehicle. The undersea vehicle approaches an object to be recovered and its manipulator arm grips a pair of spring biased actuators. Linkage or lever arms extend from each of the actuators to off-center portions of a pair of pivotally mounted tongs. Squeezing the actuators together separates the tongs and they are placed about the object. When the pressures are released, the actuators force the tongs to grasp the object. A hoisting cable, coupled in a centrally in-lined position with respect to the tongs, hauls the object upward which causes the tongs to grip the object more securely.

5 Claims, 7 Drawing Figures

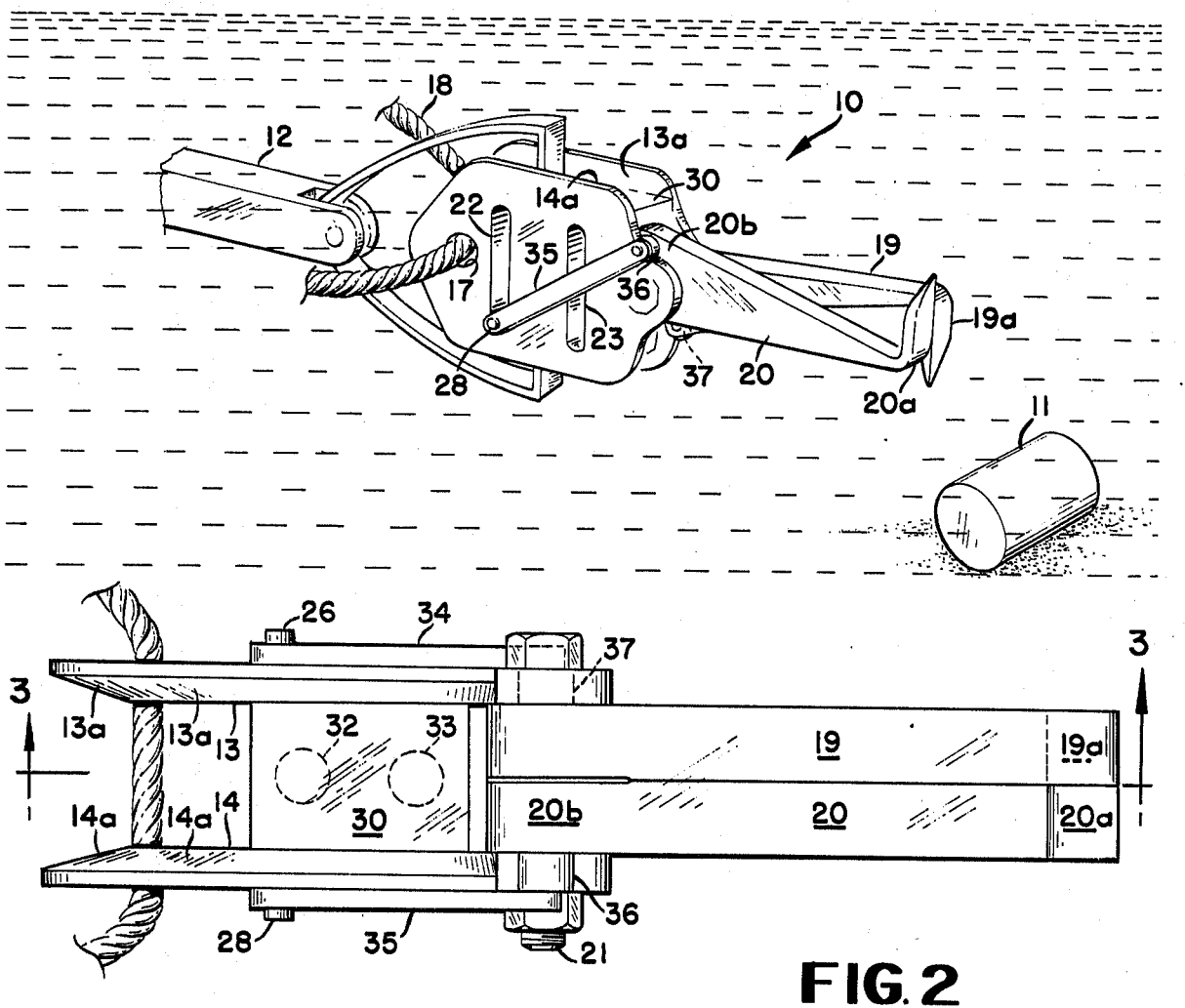
FIG. 1
FIG. 2
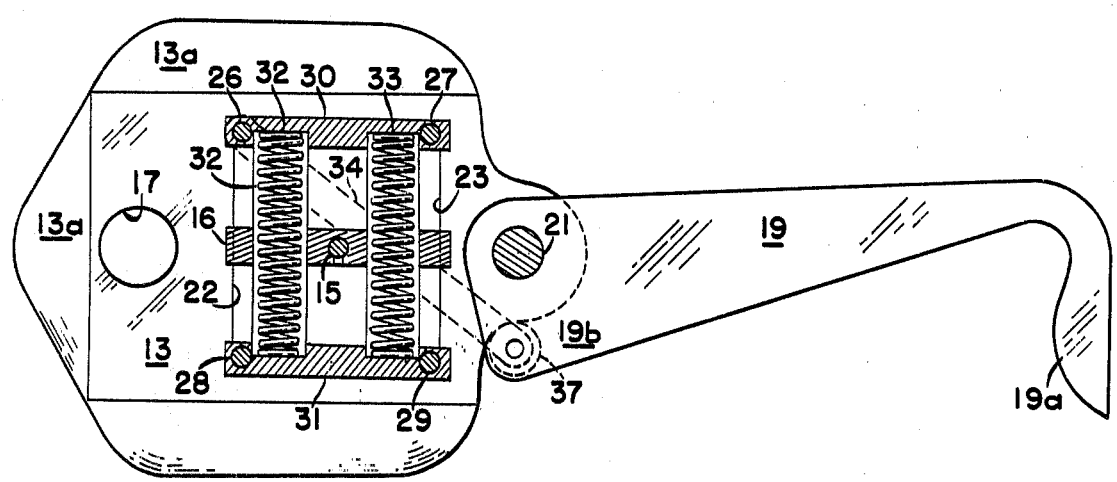
FIG. 3

TONG TYPE RECOVERY TOOL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The new generation of submersibles frequently requires sophisticated tools to work effectively. One of the tasks frequently called for is the retrieving of instrumentation or objects of scientific interest from the ocean floor. A number of the more advanced submersibles have manipulators. This hand-like device is controlled from inside the submersible and is used to grasp objects of interest. These devices have tied or wrapped recovery lines around objects, yet this process is often quite involved and tedious. To avoid these problems, a wide variety of clamps and tong-like devices for grasping an object have been designed. But, any capable of supporting an appreciable amount of weight are unduly cumbersome, and still others rely on a relatively complicated actuation sequence calling for a number of hydraulic and electrical lines. These impose luxuries which present deep diving submersibles cannot afford since ballast and trim usually are critical and too many hull penetrators can compromise the structural integrity of the craft. What is needed therefore, is a compact recovery tool of a straightforward mechanical design to assure high reliability which has the capability of being positioned, removed and repositioned by the manipulator arm of a submersible.

SUMMARY OF THE INVENTION

The present invention is directed to providing an apparatus for recovering objects that is emplaced and actuated by the manipulator arm of a submersible. A pair of spaced apart side plates is each provided with at least one lateral slot and a pair of actuators are slidably mounted in the lateral slots and adapted for reciprocal converging motion. The actuators are held apart by a pair of biasing springs and a pair of tongs are pivotally mounted between the side plates at a central front portion. An off-center portion of each of the tongs is coupled to a lever arm which is joined to one of the actuators. When the manipulator arm of a submersible squeezes the actuators together, the tongs are separated and placed about the object. Releasing pressure on the actuators causes the biasing springs to force the tongs together about the object. Since a hoisting line is mounted centrally aligned with the tongs once lifting begins, the tongs hold the object more securely.

An object of the invention is to provide an improved recovery tool.

Another object is to provide a tool which is capable of being actuated by the manipulator arm of a submersible.

Yet another object of the invention is to provide a recovery tool of high reliability due to its uncomplicated design.

Still another object is to provide a recovery tool having a simple actuation sequence.

Still another object is to provide a recovery tool capable of being positioned, removed and repositioned by a submersible without any alterations.

Yet another object is to provide a recovery tool not necessitating hydraulic or electrical hull penetrators for its actuation.

These and other objects of the invention will become more readily apparent from the ensuing description when taken with the drawings.

BRIEF DESCRIPTION OF THE DRAWINGS

FIG. 1 is a representation of a manipulator arm placing the recovery tool near an object of interest.

FIG. 2 is a top view of the invention.

FIG. 3 is a cross-sectional view of the recovery tool taken generally along line 3—3 in FIG. 1.

DESCRIPTION OF THE PREFERRED EMBODIMENT

Figure 4:
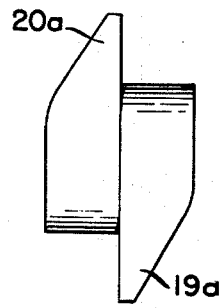
FIG. 4 is an end view of the tongs.
Figure 5:
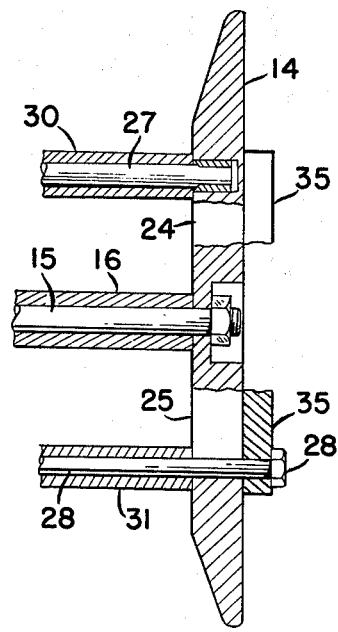
FIG. 5 is a cross-sectional view of a side plate.

Referring now to the drawings, there is shown a recovery tool 10 about to grasp an object of interest 11. The object can be expended practice ordnance, instrumentation or a chunk of minerals which should be inspected in greater detail on the surface.

The recovery tool is held, positioned and engaged by a manipulator arm 12 extending from a submersible. Such manipulator arms are in use on some of the most sophisticated submersibles and rely upon hydraulic or electrical driving mechanisms to open and close them upon command from within the submersible.

The recovery tool is constructed from a corrosion resistant or noncorrosive metal to help ensure more reliable functioning in the harsh marine environment. Appropriate preventative maintenance, e.g. polishing, proper lubrication, etc., are practiced which are consistent with proven marine design.

A pair of side plates 13 and 14 is held together by at least one bolt 15 and the side plates are spaced apart a predetermined separation by a spacer 16 carried on the bolt. Bevelled surfaces 13a and 14a are formed on the inside of the plates for weight reduction and to serve as a guide when the manipulator enters the tool.

At one end of the side plates, a pair of aligned holes 17 is provided to receive a hoisting cable 18. The holes are bored in the side plates along longitudinal center lines so that when the hoisting cable is passed therethrough and begins to raise a recovered object, the hoisting force is transmitted directly along the tool's center line. Elaboration on the advantages of this arrangement will be discussed later.

At the opposite end of the side plates and in central alignment with holes 17 a pair of tongs 19 and 20 is journalled to the side plates on a heavy duty bolt 21. The hook portions 19a and 20a are fashioned to grasp a recovery object and when the tongs are closed they overlap to a degree. The tongs are each shaped with off-center portions 19b and 20b which are specifically designed to lie outside of the normal center line of the tool. The successful operation of this invention depends in part on the mechanical coaction between the off-center portion and other elements to be discussed below.

Each of the side plates is provided with a pair of lateral slots 22 and 23 or 24 and 25. The slots on each plate are arranged in a parallel relationship and each plate's slots are laterally aligned with respect to the other plate's slots.

The slots are so arranged to receive follower bolts 26 and 27 and 28 and 29. Follower bolts 26 and 28 are longer to extend through the slots and beyond the lateral dimensions of the side plates. Follower bolts 27 and 29 are shorter and are equipped with bearing nuts which ride in the slots.

On each pair of follower bolts, pair 26 and 27 and pair 28 and 29, an actuator pad 30 or 31 is carried. The pad is a semirigid material and optionally has a roughened or serrated outwardly facing surface to aid the manipulator's gripping the recovery tool. A pair of helical biasing springs 32 and 33 is held between the pads and force the two pads apart. The springs' constants are such as to require at least a moderate pressure by the manipulator to overcome their biasing effect.

A separate linkage or lever arm 34 or 35 is coupled to follower bolts 26 and 28 respectively, on the outside of side plates 13 and 14. The other end of each of the lever arms is connected to a respective one of the tongs 19 or 20 at an off-center portion 19b and 20b. The connections at opposite ends of both of the lever arms are journalled ones to permit unrestricted pivotal motion on the actuator pads and the tongs.

Figure 6:
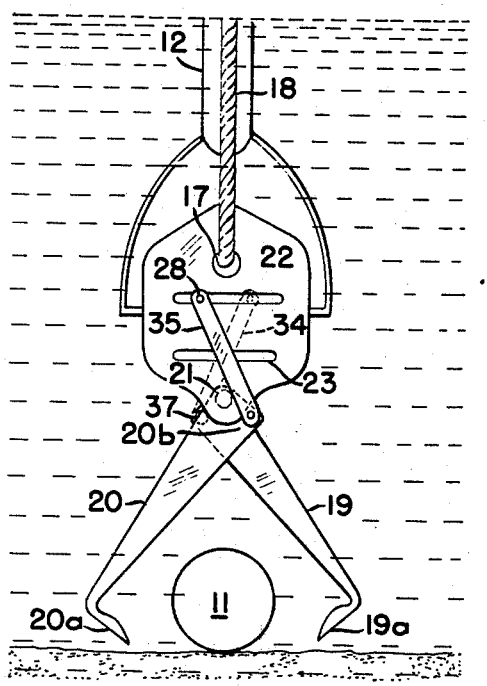
FIG. 6 is a side view of the tool about to grasp an object.
Figure 7:
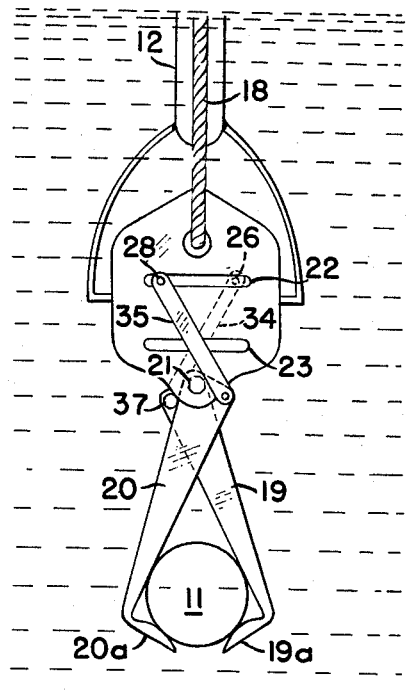
FIG. 7 is a depiction of the invention grasping an object of interest which is being hauled to the surface.

The tool is carried on a special rack on the submersible and when it is needed, the manipulator grasps it and puts it to use. The compression or squeezing of the actuator pads together by the manipulator overcomes the biasing effect of the helical biasing springs. As the two actuator pads converge toward each other, lever arms 34 and 35 transmit a parting force to the respectively interconnected off-center portions 19b and 20b of tongs 19 and 20. The tongs spread apart to the open position, see FIG. 6. In this condition they are maneuvered by the manipulator into position about the recovery object. Once so located, the manipulator is relaxed, and the biasing force of helical biasing springs 32 and 33 pulls the tongs together about the object.

The interconnected hoisting cable 18 begins to exert an upward force. This upward force is transmitted along the center line and tends to pull the tongs tighter about the object.

This tightening of the tongs along with the biasing force of the springs ensure that the tongs securely engage the recovery object. While the object is being hauled to the surface, the submersible is free to perform other tasks and may affix another recovery tool to another object.

Obviously, many modifications and variations of the present invention are possible in the light of the above teachings, and, it is therefore understood that within the scope of the disclosed inventive concept the invention may be practiced otherwise than specifically described.

What is claimed is:

1. An apparatus for recovering objects comprising:
    a pair of spaced apart side plates each provided with at least one lateral slot;
    a pair of actuators each slidably mounted in the lateral slots of both side plates and adapted for reciprocable converging motion;
    means for biasing the actuators away from one another;
    a pair of tongs pivotally mounted between the side plates at a central front portion and having an off-center portion;
    a pair of lever arms, each connected at a first end to a respective actuator and diagonally extending across the side plates to be connected at a second end to a respective tong at the off-center portion whereby when the actuators are squeezed together, the lever arms spread the tongs apart and when the actuators are released, the biasing means pulls the tongs together and allows them to grab the object.

2. An apparatus according to claim 1 further including:
    means centrally located on side plates at a central rear location for lifting the object, the location of the lifting means and the off center connection of the actuators to the tongs ensure that the tongs self lock while the object is being lifted.

3. An apparatus according to claim 2 in which there are provided two parallel lateral slots in each side plate and each actuator is a bolt extending between aligned slots in the side plates and a pad carried on the bolts.

4. An apparatus according to claim 3 in which the biasing means are two helical springs held in compression to urge the actuators apart and the lifting means is a pair of holes for receiving a hoisting cable.

5. An apparatus according to claim 4 in which the lever arms are disposed on the outside of the side plates and are pivotally connected to a bolt of an actuator and an off-center portion.

* * * * *